United States Patent
Suzuki et al.

(10) Patent No.: US 8,175,060 B2
(45) Date of Patent: May 8, 2012

(54) COMMUNICATION DEVICE AND COMMUNICATION METHOD

(75) Inventors: Hidetoshi Suzuki, Yokohama (JP);
Takashi Okada, Yokohama (JP);
Shinsuke Ogawa, Yokohama (JP);
Masayuki Furusawa, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 282 days.

(21) Appl. No.: 12/596,259

(22) PCT Filed: Mar. 26, 2008

(86) PCT No.: PCT/JP2008/055729
§ 371 (c)(1),
(2), (4) Date: Feb. 24, 2010

(87) PCT Pub. No.: WO2008/132920
PCT Pub. Date: Nov. 6, 2008

(65) Prior Publication Data
US 2010/0144297 A1 Jun. 10, 2010

(30) Foreign Application Priority Data
Apr. 16, 2007 (JP) .............................. P2007-107331

(51) Int. Cl.
*H04W 4/00* (2009.01)
*H04K 3/00* (2006.01)

(52) U.S. Cl. ....................................... 370/331; 455/436

(58) Field of Classification Search .......... 370/331–333; 455/226.2, 436–437, 442
See application file for complete search history.

(56) References Cited

U.S. PATENT DOCUMENTS
7,787,845 B2 * 8/2010 Lindoff et al. ............. 455/226.1

2005/0233715 A1 10/2005 Laroia et al.
2006/0192632 A1 8/2006 Nakai et al.
2008/0130615 A1 6/2008 Kashiwagi et al.

FOREIGN PATENT DOCUMENTS
| JP | 11 69414 | 3/1999 |
| JP | 11 234720 | 8/1999 |
| JP | 2000 134667 | 5/2000 |
| JP | 2004 266361 | 9/2004 |
| WO | 2005 109657 | 11/2005 |
| WO | 2006 077696 | 7/2006 |

OTHER PUBLICATIONS

"3GPP TR 25.814: 3rd Generation Partnership Project; Technical Specification Group Radio Access Network; Physical Layer Aspects for Evolved Universal Terrestrial Radio Access (UTRA) (Release 7)", vol. 7.1.0, col. 7.1.1.1.2.1 col. 7.1.2.4.6, pp. 2,22-25 and 43-45 (Sep. 2006).

* cited by examiner

*Primary Examiner* — Lee Nguyen
(74) *Attorney, Agent, or Firm* — Oblon, Spivak, McClelland, Maier & Neustadt, L.L.P.

(57) ABSTRACT

A communication device and a communication method capable of implementing high-speed and high-quality communication processing such as handover. A mobile communication terminal is configured such that, in cases where it is judged by a power measurement unit that a reception signal received by a communication unit is equal to or less than a predetermined value, a frequency conversion unit performs computation by expanding a frequency range for performing time/frequency conversion with respect to the received reception signal. Further, a frequency measurement unit measures reception strength of reception signals in the expanded frequency range, and detects a frequency of, among the measured signals, a signal with a reception strength higher than a predetermined reception strength, and the communication unit executes connection processing by using the signal of this frequency.

5 Claims, 8 Drawing Sheets

COMMUNICATION DEVICE AND COMMUNICATION METHOD

TECHNICAL FIELD

The present invention relates to a communication device and a communication method capable of performing communications such as handover processing, and more particularly to a communication device and a communication method that perform communications using time/frequency conversion such as FFT (Fast Fourier Transform) computation.

BACKGROUND ART

When moving from a service area of a base station (eNB1) to a service area of another base station (eNB2), a mobile communication terminal (MB) such as a cellular phone is able to switch between the base stations by performing so-called handover processing. Such a mobile communication terminal searches for another base station, during handover (HO), by searching for communicable frequency channels by means of a frequency search using an RF synthesizer built into a radio circuit (RF) of the mobile communication terminal, and connects to the other base station.

Patent Document 1: Japanese Patent Application Laid-Open No. H11-234720

DISCLOSURE OF THE INVENTION

Problem to be Solved by the Invention

The following problems have arisen in using the above conventional technology, however. In a state where communication with eNB1 is established, the frequency of the RF synthesizer is locked to the frequency of eNB1, and the radio circuit is therefore unable to perform a frequency search. The radio circuit therefore performs a frequency search for the first time when communication is disconnected, and is capable of performing handover (HO) once communication with the frequency of eNB2 is possible. Communication is therefore disconnected when the radio circuit is unable to conduct an efficient search for the frequency of eNB2.

Furthermore, in cases where movement is sought while ensuring a high communication quality, because a frequency search and handover are only possible once communication is disconnected, a high communication quality without voice interruption or data loss cannot be ensured.

In addition, in order to deal with the above problem, a mode (so-called 'compress mode'), in which a link to a base station is established, and a gap in communications is secured to perform a frequency search in advance, may be considered. However, because the frequency search timing and the timing of the actual handover differ, it is hard to ensure communication quality.

It is accordingly an object of the present invention to provide a communication device and a communication method which solve the aforementioned problems and which are capable of implementing high-speed and high-quality frequency switch processing such as handover.

Means for Solving the Problem

In order to achieve the above object, the communication device of the present invention comprises a communication unit for receiving a reception signal; a signal measurement unit for measuring signal strength of the reception signal received by the communication unit; a frequency control unit for exercising control, when the signal strength measured by the signal measurement unit is equal to or less than a predetermined value, to variably set a frequency range for performing time/frequency conversion of the reception signal received by the communication unit; a frequency conversion unit for performing the time/frequency conversion in the frequency range set by the frequency control unit; a frequency measurement unit for measuring reception strength of reception signals in the frequency range converted by the frequency conversion unit; and a control unit for controlling the communication unit to execute communication processing using a frequency of, among the signals measured by the frequency measurement unit, a signal with a reception strength higher than a predetermined reception strength or higher than a reception strength of a current communication signal.

Furthermore, the communication method of the present invention comprises a communication step of receiving a reception signal; a signal measurement step of measuring signal strength of the reception signal received in the communication step; a frequency control step of exercising control, when the signal strength measured in the signal measurement step is equal to or less than a predetermined value, to variably set a frequency range for performing time/frequency conversion of the reception signal received in the communication step; a frequency conversion step of performing the time/frequency conversion in the frequency range set in the frequency control step; a frequency measurement step of measuring reception strength of reception signals in the frequency range converted in the frequency conversion step; and a control step of exercising control to execute communication processing using a frequency of, among the signals measured in the frequency measurement step, a signal with a reception strength higher than a predetermined reception strength or higher than a reception strength of a current communication signal.

According to the invention, in cases where a received reception signal is equal to or less than a predetermined value, control is executed to variably set a frequency range for performing time/frequency conversion of the received reception signal; time/frequency conversion is performed in the set frequency range, reception strength of reception signals in the time/frequency-converted frequency range is measured, and connection processing is executed by using a frequency of, among the measured signals, a signal with a reception strength higher than a predetermined reception strength or higher than a reception strength of a current communication signal. As a result, even when the frequency of the synthesizer is locked, other frequency signals of high reception strength can be measured and detected. Accordingly, the frequency search time in handover or other switch processing can be reduced to substantially zero, and the switch processing can be performed smoothly, allowing communication processing of a high speed and high quality to be performed.

In addition, the time/frequency conversion of the communication device of the present invention is preferably FFT (Fast Fourier Transform) or DFT (Discrete Fourier Transform).

The communication device of the present invention further comprises a distribution unit for distributing the reception signals received by the communication unit as a plurality of reception signals, wherein the frequency control unit divides each of the reception signals, distributed by the distribution unit, into predetermined frequency bandwidths, executes control such that the frequency bandwidths of each of the reception signals are adjacent to one another, and executes control to variably set a frequency range for the time/frequency conversion so as to include each of the frequency bandwidths; the frequency measurement unit measures the reception strength of the signals in each of the frequency bandwidths controlled by the frequency control unit; and in cases where, among the signals measured by the frequency measurement unit, a reception signal with a reception strength higher than the predetermined reception strength or higher than the reception strength of the current communication signal is measured in another frequency bandwidth, the control unit is able to execute connection processing, using the signal having the strong reception strength, across the frequency bandwidths.

According to the invention, a received reception signal is distributed as a plurality of reception signals, each of the distributed reception signals is divided into predetermined frequency bandwidths, control is executed such that the frequency bandwidths of each of the reception signals are adjacent to one another, control is executed to variably set a frequency range for the time/frequency conversion so as to include each of the frequency bandwidths, and the reception strength of the controlled signals in each of the frequency bandwidths is measured. Furthermore, in cases where, among the measured signals, a reception signal with a reception strength higher than the predetermined reception strength or higher than the reception strength of the current communication signal is measured in another frequency bandwidth, connection processing is executed, using the signal having the strong reception strength, across the frequency bandwidths. As a result, in a multiband-compatible communication device, handover or other switching processing can be performed smoothly, allowing communication processing of a high speed and high quality to be performed.

Furthermore, the communication device of the present invention further comprises a triplexer for dividing the reception signals received by the communication unit into predetermined frequency bandwidths, wherein the frequency control unit executes control to variably set a frequency range for performing the time/frequency conversion in each of the frequency bandwidths divided by the triplexer; the frequency measurement unit measures the reception strength of the signals in each of the frequency bandwidths controlled by the frequency control unit; and in cases where, among the signals measured by the frequency measurement unit, a reception signal with a reception strength higher than the predetermined reception strength or higher than the reception strength of the current communication signal is measured in another frequency bandwidth, the control unit preferably controls the communication unit to execute communication processing, using the signal having the strong reception strength, across the frequency bandwidths.

According to the present invention, by employing a triplexer whereby a received signal is tuned to each of the frequency bandwidths, a high reception quality can be ensured and the configuration is simplified in comparison with a method that simply divides the reception signal.

Effects of the Invention

The present invention allows the frequency search time to be reduced to virtually zero, enables switching to another frequency without disconnecting communications, and allows handover, for example, to be performed smoothly at high speed and with high quality, enabling improved communication quality.

Figure 1:
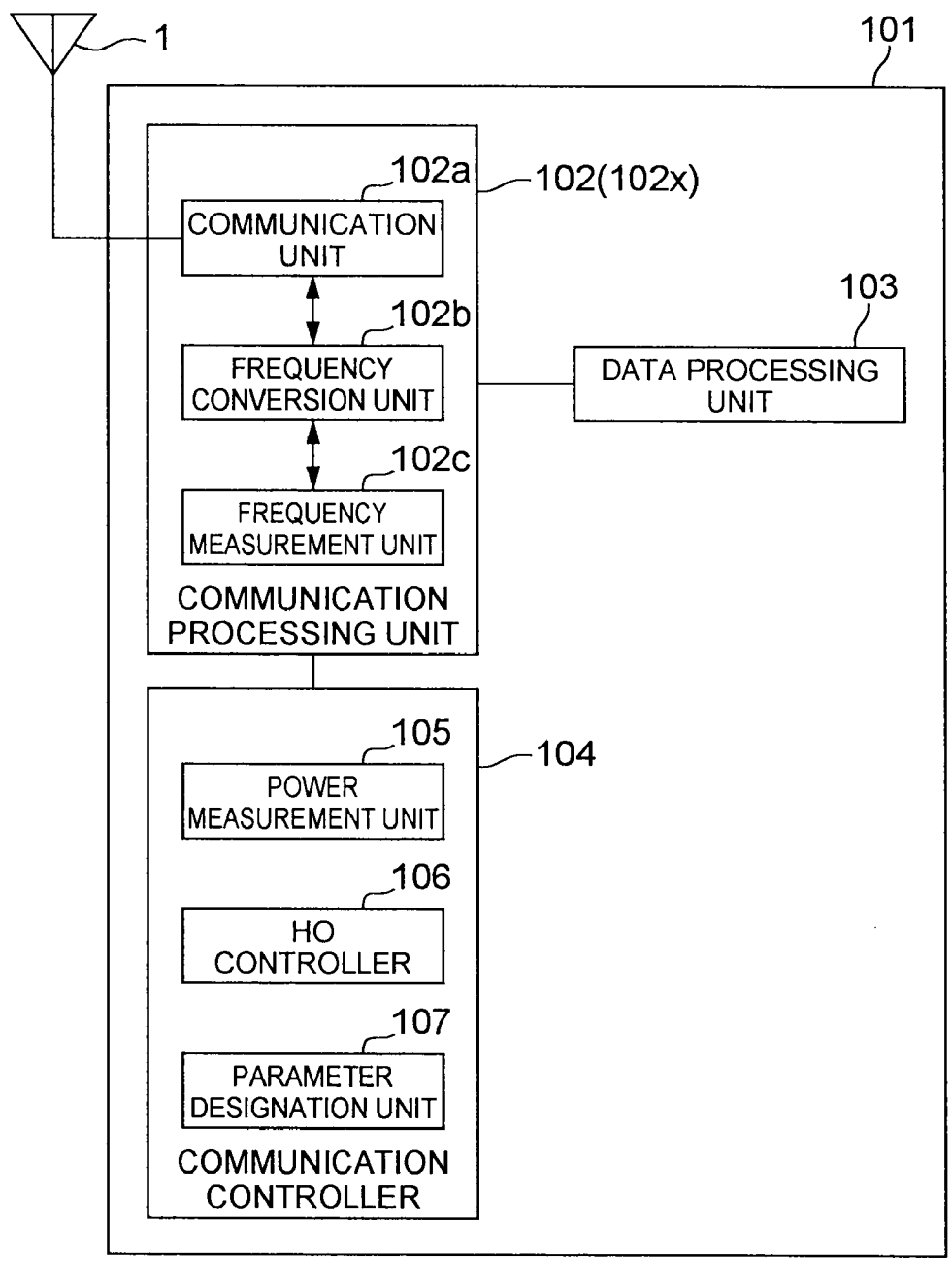
FIG. 1 is a block diagram showing the overall configuration of a mobile communication terminal 101.

EXPLANATION OF REFERENCE NUMERALS 1, 1a transmission/reception antenna
2 transmission/reception duplexer
3, 3a low-noise amplifier
4 bandpass filter
5, 5a RF synthesizer
6, 6a A/D converter
7, 7a demodulator
8 FFT processor
9 detection circuit
10 De-Mapping unit
11 bandwidth
11, 12, 12a FFT computation range
13, 14 frequency channel
15 distributor
16a, 16b frequency shifter
51, 51a, 51b mixer
101 mobile communication terminal
102, 102x communication processing unit
102a communication unit
102b frequency conversion unit
102c frequency measurement unit
103 data processing unit
104 communication controller
105 power measurement unit
106 HO controller
107 parameter designation unit
201 reception-system circuit
202 transmission-system circuit

BEST MODE FOR CARRYING OUT THE INVENTION

An FFT spectrum-based frequency search method of the present invention will be described next with reference to the drawings. Note that, where possible, the same reference numerals are assigned to the same parts, avoiding repetition in the description.

First, an overview of a mobile communication terminal 101 of this embodiment will be described. FIG. 1 is a block diagram showing the overall functions of a mobile communication terminal 101. The mobile communication terminal 101 is constituted comprising a transmission/reception antenna 1, a communication processing unit 102, a data processing unit 103, and a communication controller 104 (frequency control unit). Further, the communication processing unit 102 is constituted comprising a communication unit 102a (communication unit), a frequency conversion unit 102b (frequency conversion unit), and a frequency measurement unit 102c (frequency measurement unit). Furthermore, the communication controller 104 is constituted comprising a power measurement unit 105 (signal measurement unit), an HO controller 106 (control unit), and a parameter designation unit 107. The constitution of each of these parts will be described hereinbelow.

The communication unit 102a is a part which includes a radio (RF) circuit for processing information and a baseband (BB) circuit, and which performs RF processing and baseband processing on reception signals or transmission signals received or transmitted via the transmission/reception antenna 1.

Further, the frequency conversion unit 102b is a part that performs time/frequency conversion such as FFT. The frequency conversion unit 102b variably sets a range for the time/frequency conversion, expanding the range, for example, based on parameters designated by the parameter designation unit 107, and performs frequency conversion. Note that, when the reception power measured by the power measurement unit 105 is equal to or less than a predetermined value, the frequency conversion unit 102b receives an output to that effect from the power measurement unit 105, receives computation parameters, and executes control to expand the computation range on the basis of the computation parameters.

The frequency measurement unit 102c is a part that measures and detects, from the results of conversion by the frequency conversion unit 102b, a reception signal of a higher frequency than the reception strength of a reception signal currently being received by the communication unit 102a, or a reception signal of a higher frequency than a preset reception strength.

The specific configuration of the communication unit 102a, the frequency conversion unit 102b, and the frequency measurement unit 102c, will be described subsequently.

The data processing unit 103 is a part that converts a BB signal, obtained through processing by the communication processing unit 102, into voice or data.

The communication controller 104 is a part that includes at least the power measurement unit 105, the HO controller 106, and the parameter designation unit 107, and which executes various control for conducting communications.

The power measurement unit 105 is a part that measures the reception power of signals processed by the communication processing unit 102. Furthermore, the power measurement unit 105 measures the reception power in order to monitor communication quality, and performs transmission power control and so forth according to the reception strength, and may therefore be configured to inform information indicating the above to the transmission-system circuit 202. Furthermore, the power measurement unit 105 outputs an instruction to the communication processing unit 102 and the parameter designation unit 107 to search for frequencies from other base units in cases where the measured reception power is equal to or less than a predetermined value, and outputs an instruction to the HO controller 106 so that handover processing by the HO controller 106 is executed, using an expanded frequency range, with respect to the base stations transmitting signals at the searched frequencies. Note that, instead of the power measurement unit 105, a S/N measurement unit for measuring the S/N ratio or throughput measurement unit for measuring throughput, for example, may be used as a unit for measuring the reception quality of a reception signal.

The HO controller 106 is a part that performs various control [operations] for handover, which executes switching control to switch the communication connection from one base station to another base station, for example. Upon receipt of a handover processing instruction from the power measurement unit 105, the HO controller 106 executes handover processing with respect to the base stations transmitting signals at the frequencies sought by the communication processing unit 102.

In addition, the parameter designation unit 107 is a part that designates computation parameters (designated frequency, FFT size, and so forth), which are used in FFT or other frequency conversion processing of the frequency conversion unit 102b in cases where the reception power measured by the power measurement unit 105 is equal to or less than a predetermined value. In cases where the reception power measured by the power measurement unit 105 is judged to be equal to or less than a predetermined value, the parameter designation unit 107 determines the computation parameters for expanding the computation range, and indicates these computation parameters to the frequency conversion unit 102b.

Note that, to simplify the description, the communication processing unit 102 and the communication controller 104 are described separately. However, the functions of the communication controller 104 may also be included in the communication processing.

Figure 2:
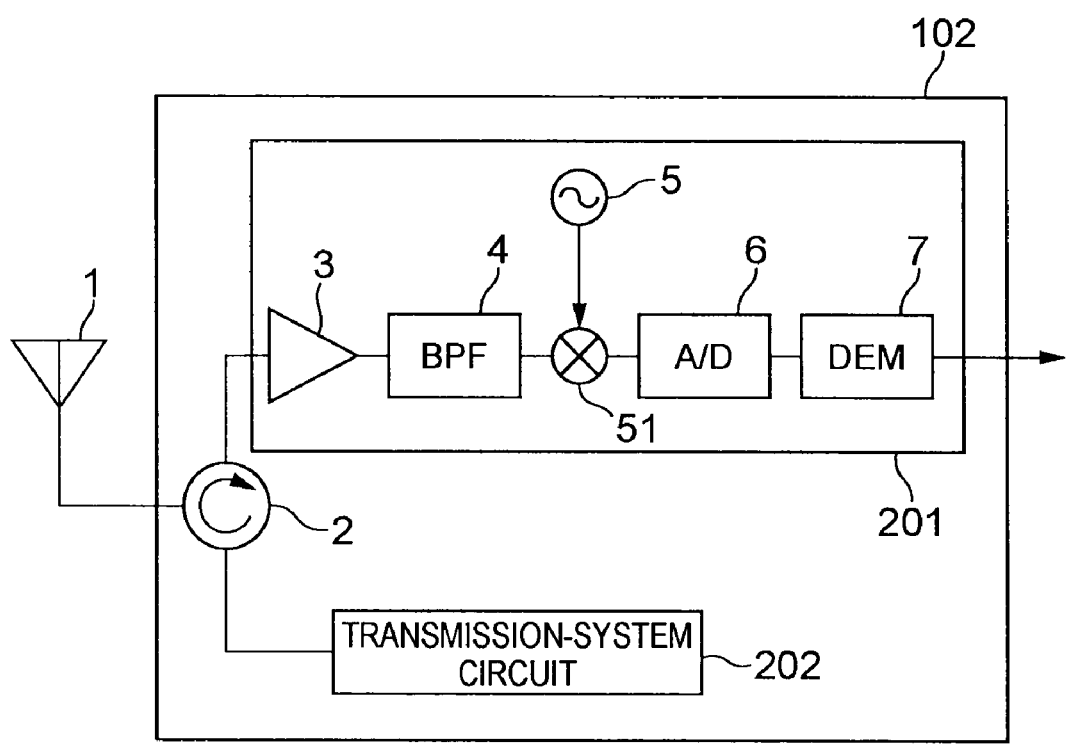
FIG. 2 is a block diagram showing a detailed circuit of a communication processing unit 102.

A reception-system circuit 201 for implementing the FFT spectrum-based frequency search method of the present embodiment will be described next. FIG. 2 is a block constitution diagram showing a detailed circuit of the communication processing unit 102, which shows an example of the configuration of the reception-system circuit 201 in particular. The block constitution diagram of FIG. 2 is obtained by taking the transmission/reception antenna 1 and the communication processing unit 102 in FIG. 1. As FIG. 2 shows, the communication processing unit 102 is constituted comprising a transmission/reception duplexer 2, the reception-system circuit 201, and the transmission-system circuit 202. In addition, the reception-system circuit 201 is constituted comprising a low-noise amplifier 3, a bandpass filter (BPF) 4, an RF synthesizer 5, a mixer 51, and an A/D converter 6, which function as the communication unit 102a, and a demodulator (DEM) 7, which functions as the frequency conversion unit 102b and the frequency measurement unit 102c.

The transmission/reception duplexer 2 is a circulator, a duplexer, a diplexer, or a switch or the like, which is a part that outputs reception signals, received via the transmission/reception antenna 1, to the reception-system circuit 201, and outputs transmission signals output from the transmission-system circuit 202 to the transmission/reception antenna 1. The low-noise amplifier (LNA) 3 is a part for amplifying reception signals.

A bandpass filter (BPF) 4 is a part that removes frequency components outside the desired frequency bandwidth of the reception signal and which extracts only signals of the desired frequency bandwidth.

The RF synthesizer 5 is a transmission circuit, which is a part that transmits a transmission signal of a predetermined frequency, and the mixer 51 is a part that down-converts a reception signal output from the BPF 4, using the signal output from the RF synthesizer 5. The A/D converter 6 is a part that converts analog signals to digital signals.

The demodulator (DEM) 7 is a part that extracts voice or data by demodulating a converted digital signal. In the present embodiment, as described subsequently, the demodulator 7 includes an FFT processor 8, which functions as the frequency conversion unit 102b, and a detection circuit 9, which functions as the frequency measurement unit 102c, the FFT processor 8 outputting an FFT computation result obtained by expanding the computed range, and the detection circuit 9 enabling a search for other frequencies on the basis of the computation result output by the FFT processor 8.

Figure 3:
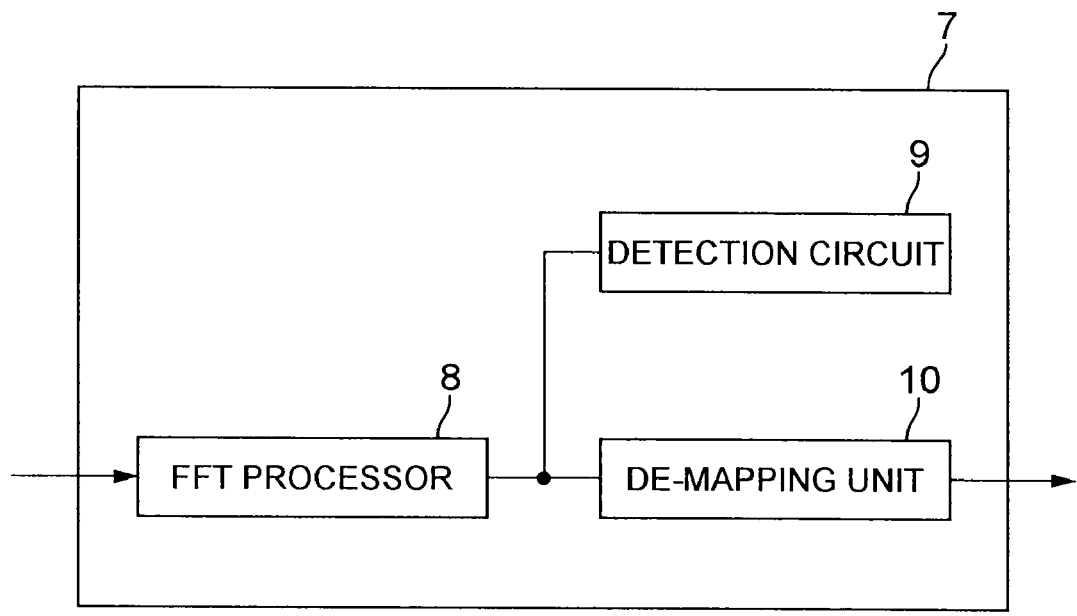
FIG. 3 is a block diagram showing an internal configuration of a demodulator (DEM) 7.

The specific configuration of the demodulator 7, which implements the FFT spectrum-based frequency search method according to the present embodiment, will be described next. FIG. 3 is a block diagram providing an overview of the internal configuration of the demodulator (DEM) 7. As shown in FIG. 3, the demodulator 7 includes the FFT processor 8 (frequency conversion unit), the detection circuit 9 (frequency measurement unit), and a De-mapping unit 10. Note that the block diagram shown in FIG. 3 shows part of the demodulator 7.

The FFT processor 8 is a part that Fourier-converts a reception signal that has been down-converted by the RF synthesizer 5. The range calculated by the FFT computation is normally a range corresponding to the bandwidth in which communications are normally performed. For example, the FFT processor 8 performs FFT computation with respect to a range on the order of 5 MHz+ a few hundred kHz in the case of a signal with a bandwidth of 5 MHz. Here, in cases where the reception power measured by the power measurement unit 105 falls to or below a predetermined value and handover processing is executed by the HO controller 106, the FFT processor 8 performs processing to temporarily expand the range calculated by the FFT computation in order to perform a frequency search, the range expansion being limited by the frequency range filtered by the BPF 4. For example, when all the channels of the frequencies used are assumed to have a range of 20 MHz, the FFT processor 8 calculates the computation result by expanding the range by an amount corresponding to all the channels or to a certain specified channel and performing the FFT computation. The expansion processing is performed according to the computation parameters (designated frequencies, FFT size, and so forth) designated by the parameter designation unit 107.

The detection circuit 9 is a part that measures signals [by calculating] the frequency spectrum in a predetermined frequency bandwidth or at certain specified frequency intervals, based on the computation result calculated by the FFT processor 8, compares the measured signals with the current communication signal, and detects frequencies (channels) of a higher signal strength than the current communication signal.

The De-mapping unit 10 is a part that inversely quantizes and demodulates signals output from the FFT processor 8.

The FFT processor 8 is thus able to perform FFT computation with respect to a range expanded beyond a predetermined range, obtain the FFT computation result for the expanded range, and detect the frequency with the highest signal strength within the range.

Figure 4:
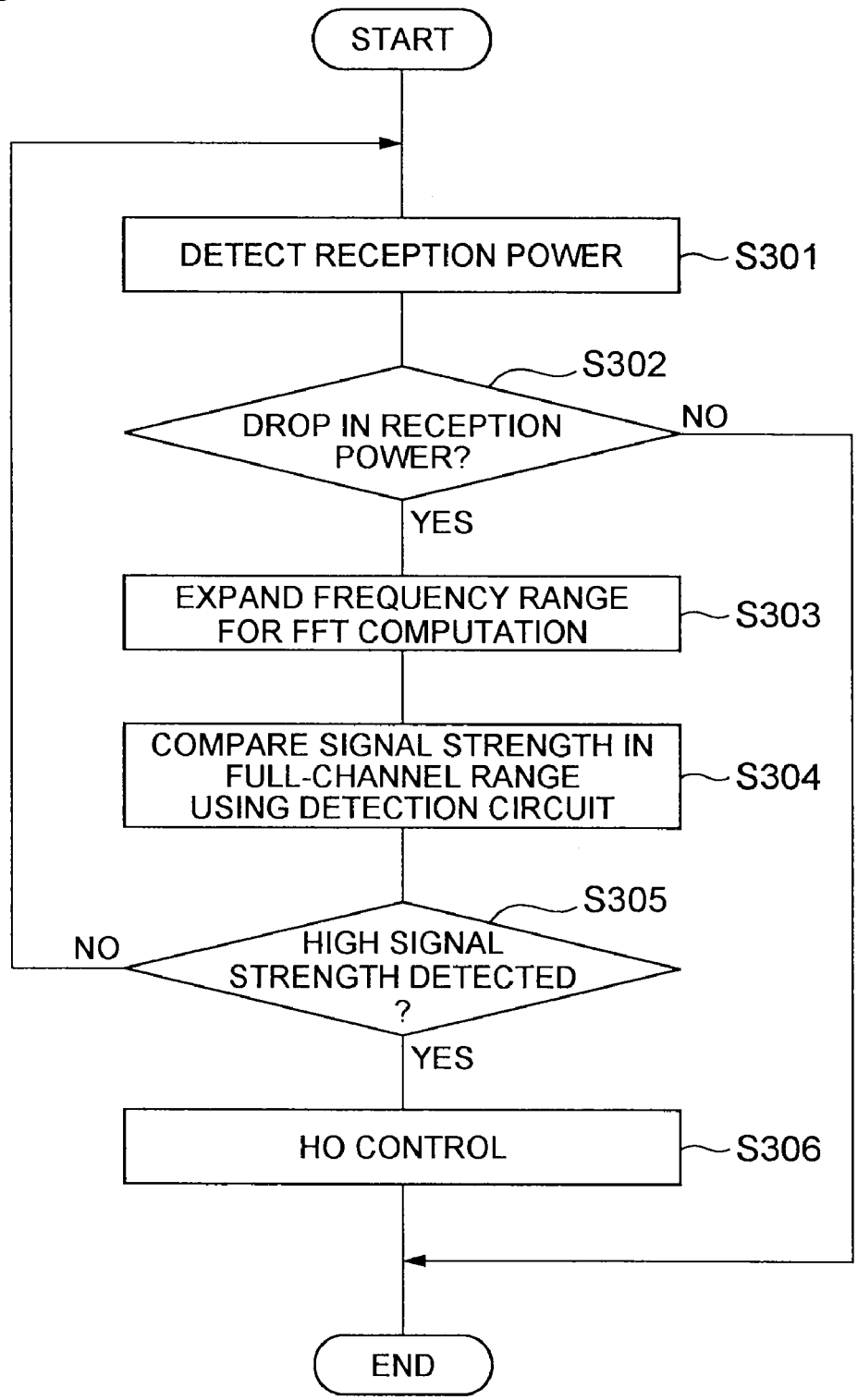
FIG. 4 is a flowchart of processing of the mobile communication terminal 101.

An operation flow for the mobile communication terminal 101 that executes the FFT spectrum-based frequency search method according to the present embodiment will be described next. FIG. 4 is a flowchart showing processing of the mobile communication terminal 101. In FIG. 4, no temporal transitions exist since a high strength signal is detected within the frequency bandwidths of signals that are acquired with a single timing.

When it is judged that the reception power measured (S301) by the power measurement unit 105 is less than a preset threshold value (S302: YES), the frequency range for the FFT computation is expanded to a full channel range by the frequency conversion unit 102b (FFT processor 8), and FFT computation is performed (S303).

Furthermore, signal strength is measured by the frequency measurement unit 102c (the detection circuit 9) for each predetermined frequency within the frequency spectrum obtained through FFT computation using the expanded range, and the signal strengths are compared (S304). Note that the frequency intervals set for detection may also be discrete.

The signal strength measured by the frequency measurement unit 102c (detection circuit 9) is compared with the strength of the current communication signal and, when a frequency of a signal having a strength higher than the communication signal strength is measured (S305: YES), handover control by the HO controller 106 is then performed using the measured frequency (S306). Note that the timing for performing handover control may be set as the time when the [communication] line is disconnected.

Furthermore, in cases where a frequency of a signal having a strength higher than the communication signal strength has not been measured (S305: NO), the processing returns to step S301 and is repeated. At this time, the time interval for repeating the processing may be set as definite or indefinite. Further, the processing is terminated when the drop in reception power has been restored (S302: NO). An operation triggered by a drop in reception power is described as an example of operation processing here, but S301 and S302 are not necessarily required. Since the above processing is also effective in ensuring a high communication quality during movement, this processing is not limited to handover processing.

Figure 5:
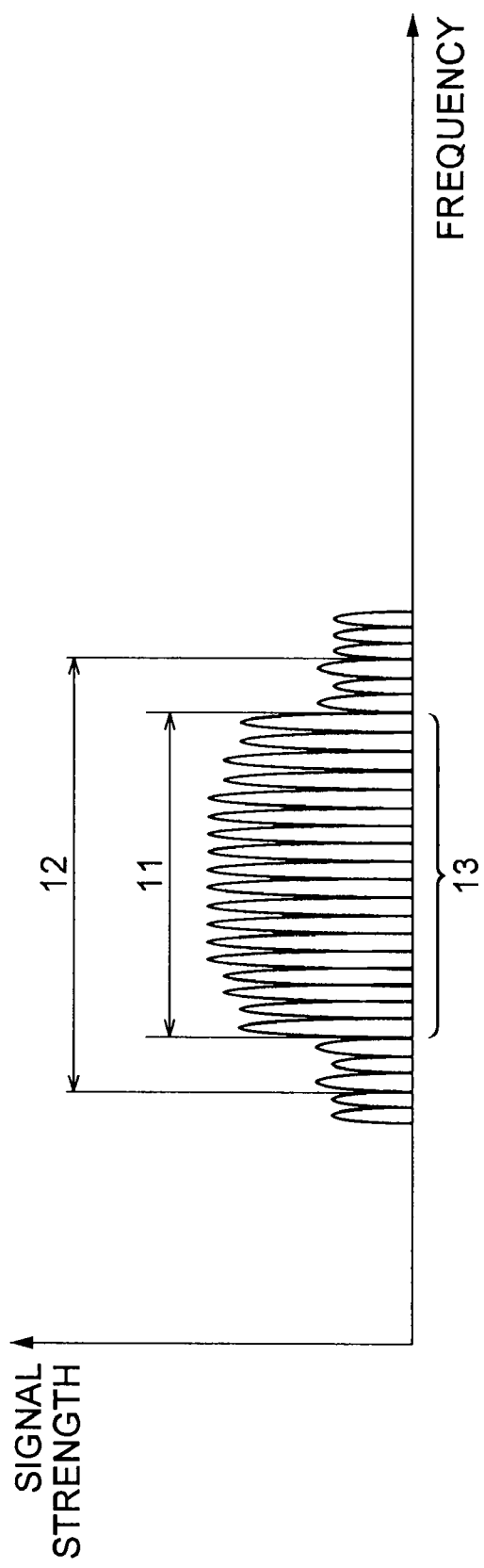
FIG. 5 is an explanatory diagram showing an example of a frequency spectrum after FFT computation.

An example of an FFT-computed frequency spectrum in this operation will now be described. FIG. 5 is an explanatory diagram showing an example of a frequency spectrum obtained after receiving a reception signal of one frequency bandwidth and subjecting the signal to FFT computation. FIG. 5 shows the result of FFT processing by the frequency conversion unit 102b (FFT processor 8) with respect to signals in the range indicated by the FFT computation range 12, which is a wider range than the bandwidth 11. The frequencies included in the bandwidth 11 represent a frequency channel 13, and the communication processing unit 102 performs communication processing using the frequency channel 13.

Figure 6:
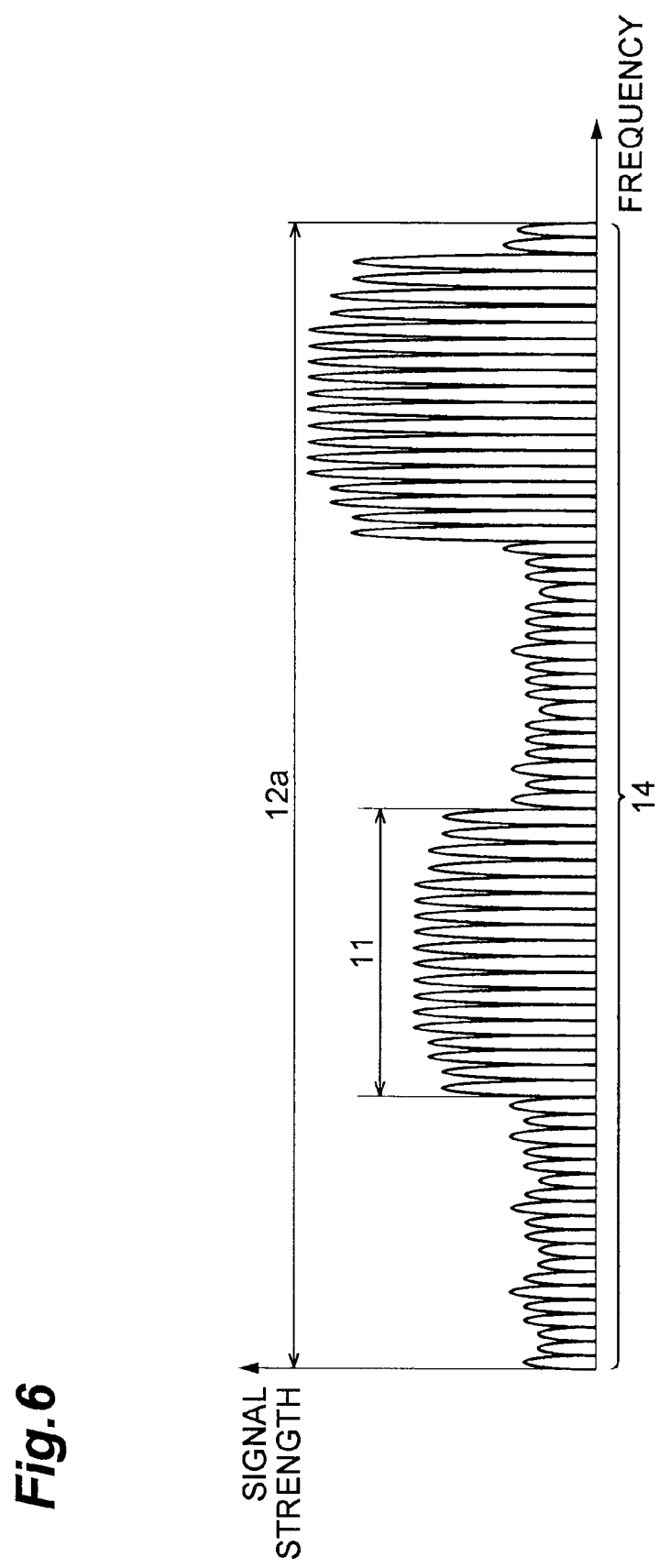
FIG. 6 is an explanatory diagram of an example of a frequency spectrum after FFT computation in a case where the frequency range of the FFT computation is expanded to a full frequency bandwidth.

Thereafter, FIG. 6 is an explanatory diagram showing an example of an FFT-computed frequency spectrum when the frequency range of the FFT computation is expanded to a full frequency bandwidth (all channels). Here, a case is shown where FFT processing is performed by the FFT processor 8 on frequencies in the range indicated by an FFT computation range 12a, which is obtained by expanding the normal FFT computation range 12. Here, as described earlier, the communication processing unit 102 performs communication processing using a frequency channel 14. Note that the expanded FFT computation frequency range is not limited to the full frequency bandwidth. It can be seen that, during normal communication, the FFT computation is performed in a slightly wider range than the bandwidth 11, as shown in FIG. 5, but that, when a frequency search is performed, the FFT range is expanded to the frequency channel 14, as shown in FIG. 6. A comparison of signal strengths at this time is executed by the frequency measurement unit 102c (the detection circuit 9), which performs the frequency search.

Figure 7:
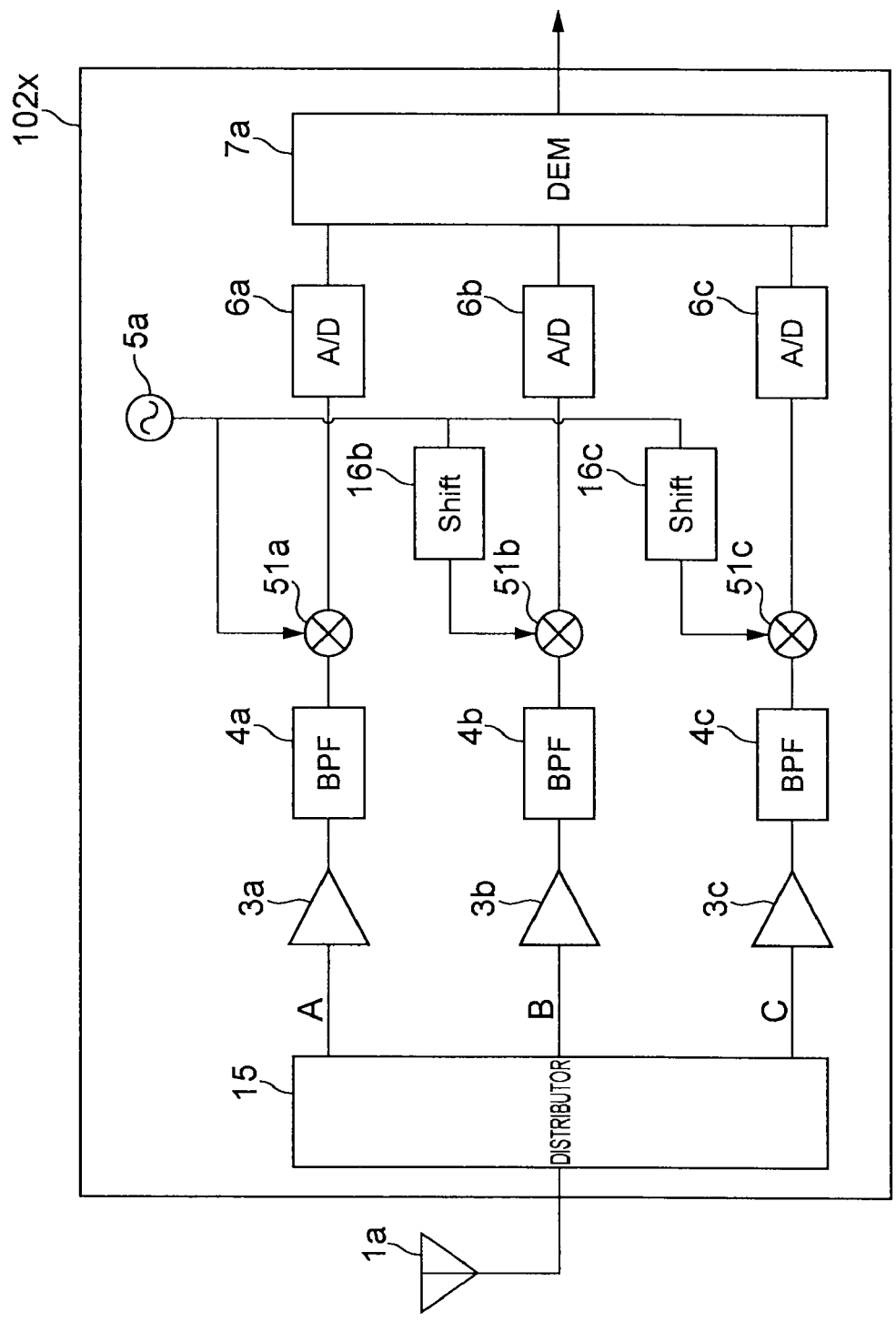
FIG. 7 is a block diagram showing the configuration of a communication processing unit 102x in a multiband-compatible mobile communication terminal 101.

The method for expanding the FFT computation range during handover can also be used in the case of a multiband configuration using a distributor. An example of the circuit configuration in this case is shown in FIG. 7. FIG. 7 is a block diagram showing the configuration of a communication processing unit 102x in the multiband-compatible mobile communication terminal 101. The mobile communication terminal 101 is constituted comprising a transmission/reception antenna 1a, a distributor 15 (distribution unit), low-noise amplifiers 3a to 3c, BPFs 4a to 4c, an RF synthesizer 5a, mixers 51a to 51c, A/D converters 6a to 6c, a demodulator 7a, and frequency shifters 16a and 16b.

The distributor 15 is a part that distributes signals received via the transmission/reception antenna 1a. In the present embodiment, signals are distributed via an output a, serving as a first frequency band receiving system, an output b, serving as a second frequency band receiving system, and an output c, serving as a third frequency band receiving system.

The low-noise amplifiers (LNA) 3a to 3c are parts that amplify the reception signals distributed by the distributor 15.

The bandpass filters (BPF) 4a to 4c are parts that suppress frequency components of a reception signal that lie outside a desired frequency bandwidth, and which extracts only the desired frequency bandwidth.

Figure 8:
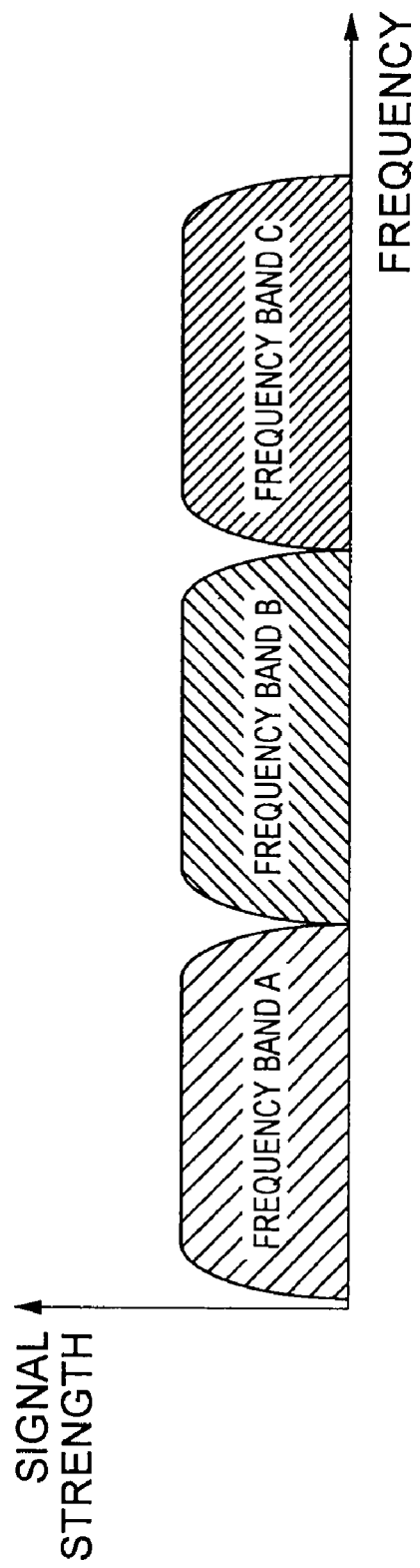
FIG. 8 is an explanatory diagram of the disposition of A/D-converted frequencies when dealing with multibands.

The RF synthesizer 5a is a transmission circuit, which is a part that transmits a transmission signal of a predetermined frequency. A mixer 51a is a part that down-converts a reception signal output from the BPF 4a, using the signal output from the RF synthesizer 5a. Furthermore, mixers 51b and 51c are parts that down-convert reception signals output from the BPFs 4b and 4c using frequencies obtained by the frequency shifters 16b and 16c that shift the transmission signal output from the RF synthesizer 5a to the desired frequency bandwidths (frequency bands). Note that the shift amounts imparted by the frequency shifters 16 are adjusted such that the frequency bandwidths are adjacent to one another. More specifically, as shown in FIG. 8, the frequency shifters 16b and 16c perform frequency shift processing so that the down-converted frequencies are arranged by being shifted to each of the channel bandwidths used as a frequency band A (corresponds to output a), a frequency band B (corresponding to output b), and a frequency band C (corresponding to output c).

The A/D converters 6a to 6c are parts that convert analog signals into digital signals.

The demodulator (DEM) 7a is a part that extracts voice or data by demodulating a converted digital signal.

The mobile communication terminal having such a configuration, and the communication processing unit 102x provided in the mobile communication terminal are able to perform collective FFT computation with respect to all the signal frequency bandwidths, including the frequency band A, the frequency band B, and the frequency band C, and compare the signal strengths at this time using the detection circuit 9. It is thus possible to implement a multiband frequency search. For example, in cases where a signal strength higher than a predetermined value is detected in frequency band C during communications using frequency band A, the mobile communication terminal 101 (HO controller 106) is also able to switch from frequency band A to frequency band C. High-speed and high-quality handover between different bands can therefore be implemented.

Furthermore, although a case where a distributor is used to distribute frequencies was described here, a triplexer tuned to each frequency bandwidth may also be adopted instead of a distributor. For example, when a triplexer is used, the demodulator 7a (FFT processor) expands the FFT computation range in each of the frequency bandwidths divided by the triplexer, and the demodulator 7a (detection circuit) measures reception signals which have a reception strength higher than the current communication reception signal. Further, in cases where the demodulator 7a (detection circuit) measures, in another frequency bandwidth, a reception signal with a strength higher than a predetermined reception strength or a reception signal with a strength higher than the reception strength of the current communication signal, among the measured signals, the HO controller 106 controls the communication processing unit 102 in order to execute, across the frequency bandwidths, communication processing using the signal with the strong reception strength or a reception signal with a strength higher than the reception strength of the current communication signal.

The mobile communication terminal 101 having the above configuration and the operating effect of the multiband-compatible mobile communication terminal 101 will be described next. The mobile communication terminal 101 of the present embodiment is configured such that, in cases where it is judged by the power measurement unit 105 that a reception signal received by the communication processing unit 102 is equal to or less than a predetermined value, the frequency conversion unit 102b (FFT processor 8) in the communication processing unit 102 performs FFT computation by expanding the frequency range for performing the time/frequency conversion (FFT or DFT, for example) with respect to the received reception signal. Here, this is implemented by changing the FFT parameter settings, for example. This applies not only to frequency range expansion but also other states.

Furthermore, the frequency measurement unit 102c (detection circuit 9) in the communication processing unit 102 measures the reception strength of the reception signals in the expanded frequency range, and detects a frequency of, among the measured signals, a signal with a reception strength which is higher than a predetermined reception strength. The communication controller 104 executes communication processing using the detected frequency signal. In this embodiment, handover control and base station switching can be performed by the HO controller 106, for example. As a result, even when the frequency is locked by the RF synthesizer 5, another high frequency signal can be measured and detected. Switching processing such as handover processing can accordingly be performed smoothly, and high-speed, high-quality communication processing can be executed.

In addition, according to the multiband-compatible mobile communication terminal 101 of the present embodiment, the distributor 7 distributes a received reception signal as a plurality of reception signals. Furthermore, the communication processing unit 102 divides each of the distributed reception signals into predetermined frequency bandwidths and executes control such that the frequency bandwidths of the respective reception signals are adjacent to one another. Here, a transmission signal output from the RF synthesizer 5a is subjected to shift processing using the frequency shifters 16b and 16c, and control is executed to shift the frequency bandwidths of the reception signals input to the FFT processor 8. In other words, the frequency shifters 16b and 16c operate such that the respective frequency bandwidths [of the signals] are adjacent to each other.

Furthermore, the frequency conversion unit 102b (FFT processor 8) expands the frequency range to be computed, for example, in order to variably set a frequency range for the time/frequency conversion so as to include each frequency bandwidth, and the frequency measurement unit 102c (the detection circuit 9) measures the signal reception strength in each of the expanded frequency bandwidths. Furthermore, in cases where, among the signals measured by the frequency measurement unit 102c (detection circuit 9), a reception signal with a strength higher than a predetermined reception strength or higher than the reception strength of the current communication signal is measured and detected in another frequency bandwidth, the HO controller 106 executes handover processing across the frequency bandwidths using the signal with the strong reception strength or a reception signal with a strength higher than the reception strength of the current communication signal. As a result, in a multiband-compatible mobile communication terminal, handover processing or other switching processing can be executed smoothly, allowing communication processing of a high speed and high quality to be performed.

Moreover, a triplexer that divides the reception signal into each predetermined frequency bandwidth may also be used in place of the distributor 15. Here, in comparison with a case where the distributor 15, which simply divides the reception signal, is adopted, a high reception quality can be ensured and the configuration is simplified.

The invention claimed is:

1. A communication device, comprising:
   a communication unit for receiving a reception signal;
   a signal measurement unit for measuring signal strength of the reception signal received by the communication unit;
   a frequency control unit for exercising control, when the signal strength measured by the signal measurement unit is equal to or less than a predetermined value, to variably set a frequency range for performing time/frequency conversion of the reception signal received by the communication unit;
   a frequency conversion unit for performing the time/frequency conversion in the frequency range set by the frequency control unit;
   a frequency measurement unit for measuring reception strength of reception signals in the frequency range converted by the frequency conversion unit; and
   a control unit for controlling the communication unit to execute communication processing using a frequency of, among the signals measured by the frequency measurement unit, a signal with a reception strength higher than a predetermined reception strength or higher than a reception strength of a current communication signal.

2. The communication device according to claim 1, wherein the time/frequency conversion is FFT (Fast Fourier Transform) or DFT (Discrete Fourier Transform).

3. The communication device according to claim 1, further comprising:
   a distribution unit for distributing the reception signals received by the communication unit,
   wherein the frequency control unit divides each of the reception signals, distributed by the distribution unit, into predetermined frequency bandwidths, executes control such that the frequency bandwidths of each of the reception signals are adjacent to one another, and executes control to variably set a frequency range for the time/frequency conversion so as to include each of the frequency bandwidths;
   the frequency measurement unit measures the reception strength of the signals in each of the frequency bandwidths controlled by the frequency control unit; and
   in cases where, among the signals measured by the frequency measurement unit, a reception signal with a reception strength higher than the predetermined reception strength or higher than the reception strength of the current communication signal is measured in another frequency bandwidth, the control unit controls the communication unit to execute communication processing, using the signal having the strong reception strength, across the frequency bandwidths.

4. The communication device according to claim 1, further comprising:
   a triplexer for dividing the reception signals received by the communication unit into predetermined frequency bandwidths,
   wherein the frequency control unit executes control to variably set a frequency range for performing the time/frequency conversion in each of the frequency bandwidths divided by the triplexer;
   the frequency measurement unit measures the reception strength of the signals in each of the frequency bandwidths controlled by the frequency control unit; and
   in cases where, among the signals measured by the frequency measurement unit, a reception signal with a reception strength higher than the predetermined reception strength or higher than the reception strength of the current communication signal is measured in another frequency bandwidth, the control unit controls the communication unit to execute communication processing, using the signal having the strong reception strength, across the frequency bandwidths.

5. A communication method, comprising:
   a communication receiving a reception signal;
   a signal measurement measuring signal strength of the reception signal received in the communication;
   a frequency control exercising control, when the signal strength measured in the signal measurement is equal to or less than a predetermined value, to variably set a frequency range for performing time/frequency conversion of the reception signal received in the communication;
   a frequency conversion performing the time/frequency conversion in the frequency range set in the frequency control;
   a frequency measurement measuring reception strength of reception signals in the frequency range converted in the frequency conversion; and
   a control exercising control to execute communication processing using a frequency of, among the signals measured in the frequency measurement, a signal with a reception strength higher than a predetermined reception strength or higher than a reception strength of a current communication signal.

* * * * *